US010891391B2

(12) United States Patent
Gordon et al.

(10) Patent No.: US 10,891,391 B2
(45) Date of Patent: Jan. 12, 2021

(54) REMOTE FILE STORAGE WITH MULTIPLE ACCESS LEVELS

(71) Applicant: International Business Machines Corporation, Armonk, NY (US)

(72) Inventors: Itai Gordon, Modiin (IL); Miriam Nizri, Givatayim (IL); Ilan D. Prager, Beit Shemesh (IL)

(73) Assignee: International Business Machines Corporation, Armonk, NY (US)

(*) Notice: Subject to any disclaimer, the term of this patent is extended or adjusted under 35 U.S.C. 154(b) by 129 days.

(21) Appl. No.: 16/115,834

(22) Filed: Aug. 29, 2018

(65) Prior Publication Data

US 2020/0074105 A1 Mar. 5, 2020

(51) Int. Cl.
*G06F 21/62* (2013.01)
*H04L 29/06* (2006.01)
*H04L 9/08* (2006.01)

(52) U.S. Cl.
CPC ...... *G06F 21/6227* (2013.01); *G06F 21/6209* (2013.01); *H04L 63/105* (2013.01); *H04L 9/083* (2013.01); *H04L 2209/60* (2013.01)

(58) Field of Classification Search
CPC ............. G06F 21/6227; G06F 21/6209; H04L 63/105; H04L 9/083; H04L 2209/60
See application file for complete search history.

(56) References Cited

U.S. PATENT DOCUMENTS

| 7,380,120 B1* | 5/2008 | Garcia | G06F 21/6209 713/160 |
| 9,209,972 B2 | 12/2015 | D'Souza et al. | |
| 9,825,925 B2 | 11/2017 | Hore | |
| 9,922,200 B2 | 3/2018 | Hunt et al. | |
| 2003/0115481 A1* | 6/2003 | Baird | G06F 21/6218 726/4 |
| 2006/0259983 A1 | 11/2006 | Sperry | |
| 2008/0092239 A1* | 4/2008 | Sitrick | H04L 9/0863 726/27 |
| 2008/0118064 A1* | 5/2008 | Bhogal | G06F 21/6218 380/243 |

(Continued)

OTHER PUBLICATIONS

Seo, "An Efficient Certificateless Encryption for Secure Data Sharing in Public Clouds", IEEE Transactions on Knowledge and Data Engineering, vol. 26, No. 9, Sep. 2014, 14 pgs.

*Primary Examiner* — Joseph P Hirl
*Assistant Examiner* — Stephen T Gundry
(74) *Attorney, Agent, or Firm* — Scott S. Dobson; Maxine L. Barasch; Keohane & D'Alessandro, PLLC

(57) ABSTRACT

Disclosed embodiments provide techniques for accessing a document from a cloud storage system and controlling the display of sensitive data within the document based on user permissions. One or more restricted information segments are identified within a document to be stored on the cloud storage system. Restricted information segments can include anything within an electronic file for which it is desired to provide multiple levels of access. In some embodiments, the restricted information segments are automatically identified via computer-implemented natural language processing (NLP) techniques. For each restricted information segment, one or more alternative data sequences are generated. The alternative data sequences are encrypted using various keys residing on a client device associated with a user. The keys can be used to decrypt data stored within a multiple-value encrypted field structure. In this way, multiple levels of information can be disseminated to an audience with various permission/privilege levels.

20 Claims, 11 Drawing Sheets

(56) References Cited

U.S. PATENT DOCUMENTS

| | | | | |
|---|---|---|---|---|
| 2008/0177799 | A1* | 7/2008 | Wilson | G07D 7/202 |
| 2009/0100268 | A1* | 4/2009 | Garcia | G06F 21/6209 |
| | | | | 713/184 |
| 2010/0205189 | A1 | 8/2010 | Ebrahimi et al. | |
| 2013/0124560 | A1* | 5/2013 | O'Sullivan | G06F 21/6218 |
| | | | | 707/769 |
| 2014/0208418 | A1* | 7/2014 | Libin | G06F 21/6209 |
| | | | | 726/19 |
| 2014/0344952 | A1* | 11/2014 | Kulick | G06F 21/6245 |
| | | | | 726/28 |
| 2015/0310219 | A1* | 10/2015 | Haager | H04L 9/0869 |
| | | | | 713/165 |
| 2015/0363605 | A1* | 12/2015 | Plastina | G06F 21/6218 |
| | | | | 726/28 |
| 2015/0371613 | A1* | 12/2015 | Patel | G06F 21/10 |
| | | | | 345/549 |
| 2016/0044040 | A1* | 2/2016 | Caffary, Jr. | G06F 21/6209 |
| | | | | 726/4 |
| 2016/0078245 | A1* | 3/2016 | Amarendran | G06F 21/6218 |
| | | | | 713/193 |
| 2017/0063861 | A1* | 3/2017 | Uchizumi | H04L 63/101 |
| 2017/0201498 | A1 | 7/2017 | Baig et al. | |
| 2018/0101691 | A1* | 4/2018 | Das | H04L 63/102 |
| 2018/0285583 | A1* | 10/2018 | Dogu | G06F 21/6209 |
| 2018/0307855 | A1* | 10/2018 | Dogu | G06F 16/16 |
| 2018/0314841 | A1* | 11/2018 | Ching | G06K 9/6215 |
| 2018/0322246 | A1* | 11/2018 | Ganeshalingam | H04L 67/22 |
| 2019/0005474 | A1* | 1/2019 | Cady | H04L 9/3228 |
| 2019/0171834 | A1* | 6/2019 | Logan | G06F 21/6254 |
| 2019/0325149 | A1* | 10/2019 | Drey | G06F 21/602 |

\* cited by examiner

REMOTE FILE STORAGE WITH MULTIPLE ACCESS LEVELS

FIELD

Embodiments of the invention relate to remote file storage, and more particularly, to systems and methods for remote file storage with multiple access levels.

BACKGROUND

Increasingly, users of information technology (IT) systems are required to handle sensitive information, such as Personal Identifiable Information (PII), other Sensitive Personal Information (SPI), and information that is otherwise of a secret, sensitive, or proprietary nature. Organizations today want to move documents with sensitive information to a cloud which will decrease their storage cost, but they still want to protect the private data.

SUMMARY

In one embodiment, there is provided a computer-implemented method comprising: obtaining an electronic file; identifying a restricted information segment of the electronic file; creating a multiple-value encrypted field structure for the restricted information segment; generating an alternative data sequence for one or more fields of the multiple-value encrypted field structure; inserting the restricted information segment as a most restrictive field of the multiple-value encrypted field structure; editing the electronic file to substitute the restricted information segment with a tag, wherein the tag references the multiple-value encrypted field structure, thereby creating a field-secured electronic file; embedding the multiple-value encrypted field structure in the field-secured electronic file; and storing the field-secured electronic file at a network-accessible storage location.

In another embodiment, there is provided an electronic communication device comprising: a processor; a memory coupled to the processor, the memory containing instructions, that when executed by the processor, perform the steps of: obtaining an electronic file; identifying a restricted information segment of the electronic file; creating a multiple-value encrypted field structure for the restricted information segment; generating an alternative data sequence for one or more fields of the multiple-value encrypted field structure; inserting the restricted information segment as a most restrictive field of the multiple-value encrypted field structure; editing the electronic file to substitute the restricted information segment with a tag, wherein the tag references the multiple-value encrypted field structure, thereby creating a field-secured electronic file; embedding the multiple-value encrypted field structure in the field-secured electronic file; and storing the field-secured electronic file at a network-accessible storage location.

In yet another embodiment, there is provided a computer program product for an electronic communication device comprising a computer readable storage medium having program instructions embodied therewith, the program instructions executable by a processor to cause the electronic communication device to perform the steps of: obtaining an electronic file; identifying a restricted information segment of the electronic file; creating a multiple-value encrypted field structure for the restricted information segment; generating an alternative data sequence for one or more fields of the multiple-value encrypted field structure; inserting the restricted information segment as a most restrictive field of the multiple-value encrypted field structure; editing the electronic file to substitute the restricted information segment with a tag, wherein the tag references the multiple-value encrypted field structure, thereby creating a field-secured electronic file; embedding the multiple-value encrypted field structure in the field-secured electronic file; and storing the field-secured electronic file at a network-accessible storage location.

BRIEF DESCRIPTION OF THE DRAWINGS

Features of the disclosed embodiments will be more readily understood from the following detailed description of the various aspects of the invention taken in conjunction with the accompanying drawings.

Figure 1:
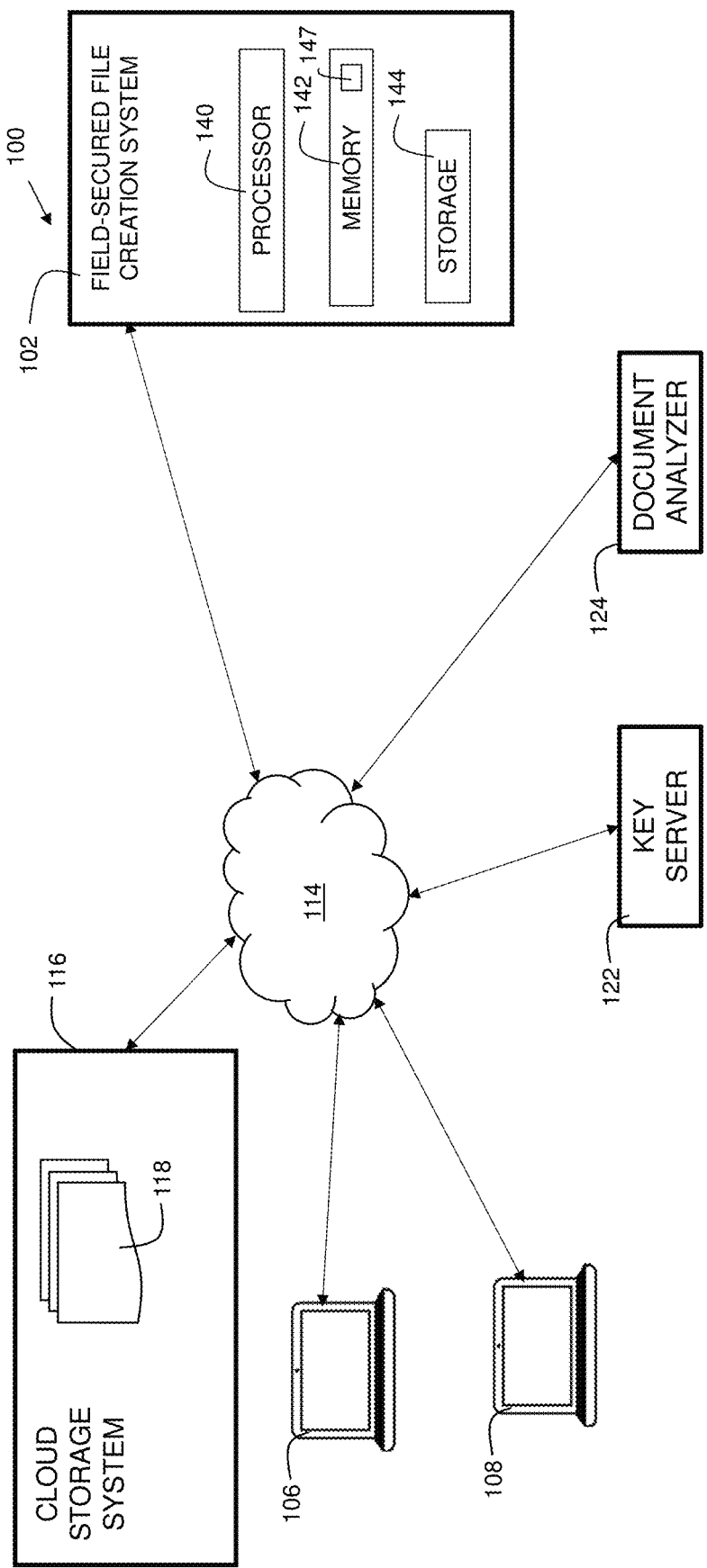
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for accessing a document from a cloud storage system and controlling the display of sensitive data within the document based on user permissions. One or more restricted information segments are identified within a document to be stored on the cloud storage system. In some embodiments, the restricted information segments are automatically identified via computer-implemented natural language processing (NLP) techniques.

Restricted information segments can include anything within an electronic file for which it is desired to provide multiple levels of access. Restricted information segments can include entities such as names, telephone numbers, dates, credit card numbers, locations, images or portions of images, and/or other data within an electronic file (document). Restricted information segments can include Personal Identifiable Information (PII), other Sensitive Personal Information (SPI), and information that is otherwise of a secret, sensitive, or proprietary nature.

For each restricted information segment, one or more alternative data sequences are generated. The generation of the alternative data sequences can be performed manually, or generated automatically via computer-implemented natural language processing (NLP) techniques. The alternative data sequences are encrypted using various keys residing on a client device associated with a user. The user may, in embodiments, receive one or more keys from a key server upon a successful login. The keys can be used to decrypt data stored within a multiple-value encrypted field structure. In this way, multiple levels of information can be disseminated to an audience with various permission/privilege levels.

As an example, a document may contain a sentence such as: "The proposed location is at the corner of North Clark Street and East Division Street in Chicago, Ill." This location can be manually or automatically identified and substituted in the document with a tag that refers to a multiple-value encrypted field structure. Each value in the multiple-value encrypted field structure conveys some information. Example field values can include a redacted text value, such as "XXXXXXX." Other field values can include "United States," which is very general, "Illinois" which is slightly more specific, "Chicago" which is yet more specific, and one field can include the original data " . . . at the corner of North Clark Street and East Division Street in Chicago, Ill."

When a user retrieves the document from cloud storage, the permissions that user has determines what string is presented in the document. As an example, if the user has the lowest privileges, s/he may be presented with a string containing redacted text data such as: "The proposed location is XXXXXXX." If a user has a higher privilege level, but not the highest, s/he may be presented with a string containing generalized text data such as: "The proposed location is Illinois." If the user has the highest privilege level, s/he is presented with the original string when viewing the document: "The proposed location is at the corner of North Clark Street and East Division Street in Chicago, Ill."

The multiple-value encrypted field structures enable the transformation of sensitive information from one value to another, depending on the privileges of the user. The keys and the documents may be stored on separate devices to provide security, while still allowing for the convenience in storage and data backup that cloud storage provides without the use of a third-party mediator to control document access. Thus, disclosed embodiments can improve the technical field of electronic document storage.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is an environment 100 for embodiments of the present invention. Field-secured file creation system 102 includes a processor 140, memory 142, and storage 144. Memory 142 stores instructions 147, which when executed by the processor, cause system 102 to implement elements of embodiments of the present invention. System 102 is an electronic communication device. System 102 is connected to network 114. Network 114 is the Internet, a wide area network, local area network, or other suitable network.

Cloud storage system 116, also connected to network 114, is one or more devices that store field-secured electronic files 118. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Each of the stored electronic files may be a document file including alphanumeric symbols (such as a Microsoft® Word® document), an image file (such as a photo or illustration), video, a combination thereof, or other suitable type of digital file.

Client devices 106 and 108 are connected to the network 114. Client devices may be smartphones, laptop computers, desktop computers, tablet computers, or other suitable devices.

Document analyzer 124, also connected to network 114, is one or more computing devices which performs analyses on an electronic file. The analysis may be natural language processing, image analysis, or other applicable technique for determining the content of the electronic file, as well as content in the file which may be sensitive and warrant privacy protection via embodiments of the invention.

Key server 122, also connected to network 114, generates keys for various levels of privilege. The keys are random computer-generated sequences, or created by another suitable mechanism. When the user logs in, and is authenticated, the server 122 serves keys to system 102, based on which tags in the electronic file are replaced with original data sequences or corresponding alternative data sequences.

In operation, a user authors, for example, a document. The user logs into cloud storage system 116 via a client 106. As part of the login process, encryption keys are retrieved by key server 122 (using ssh, https, or other suitable mechanism). In embodiments, a login script executing on cloud storage system 116 passes user credentials to key server 122 to obtain the encryption keys.

In embodiments, the user either manually specifies restricted information segments, and/or document analyzer 124 automatically identifies restricted information segments for protection. The document analyzer may generate one or more pieces of alternative data for each restricted information segment. The document can then be sent from the cloud storage system 116 to system 102 for editing to create a field-secured electronic file. The restricted information segments are encrypted in such file (the "field-secured electronic file"). The field-secured electronic file is then pushed to cloud storage system 116, replacing the original file with the field-secured electronic file.

Figure 2:
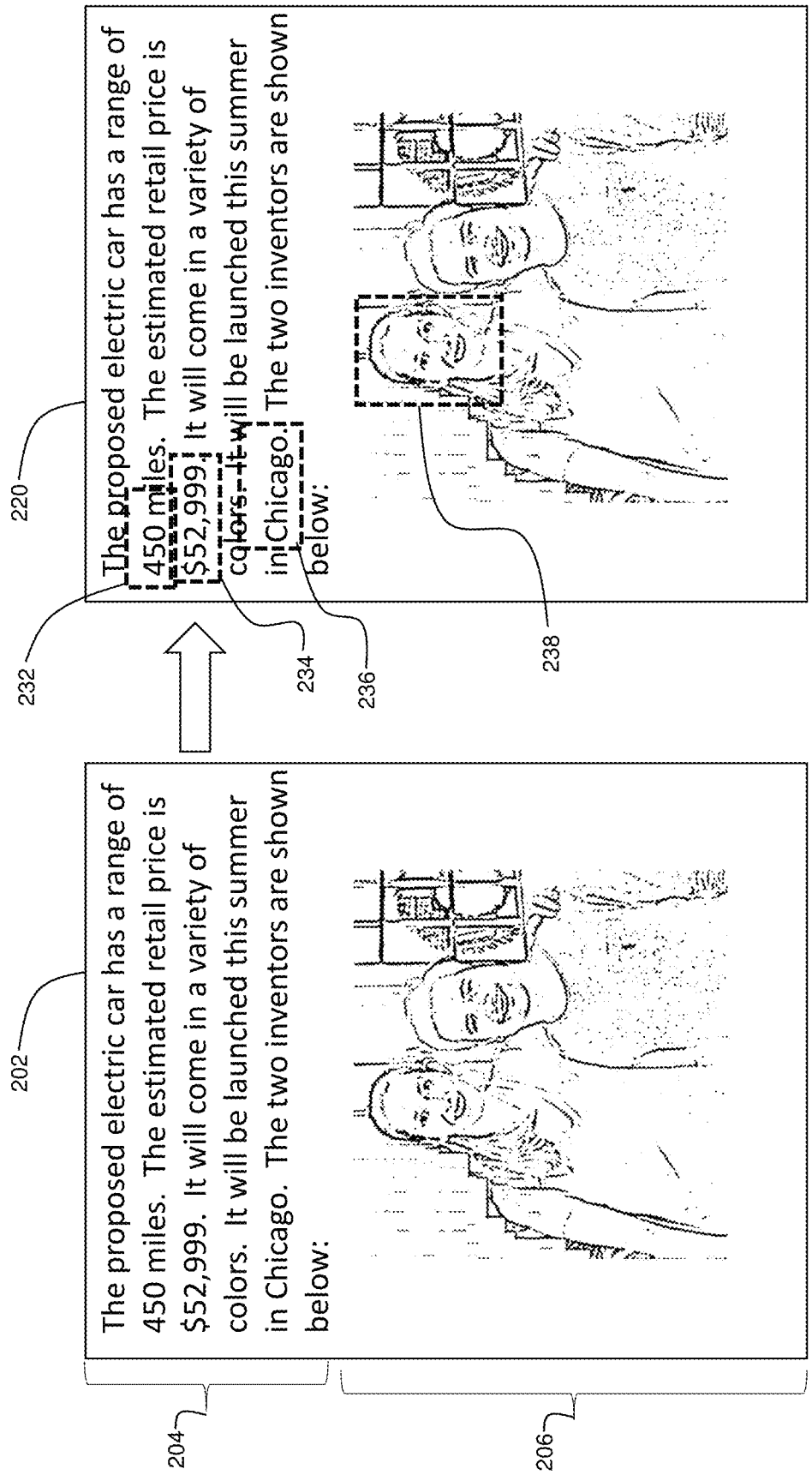
FIG. 2 shows an example of restricted information segments in an electronic file.

FIG. 2 shows an example of restricted information segments in an electronic file. Electronic file 202 represents the original document. It contains a text portion 204 and an image portion 206. Electronic file 220 represents the document after restricted information segment identification. The identification can be done either manually and/or through an automated process. Areas of text and/or image that are desired to be kept private (i.e., encrypted) from particular users are identified based on permissions associated with a privilege level assigned to each user. In an automated embodiment, natural language processing (NLP) and/or image recognition techniques (e.g., facial recognition), can be used to detect information that should be protected as private. Restricted information segments will be replaced with structures indicating encrypted data. Depending on what key the viewing user has will dictate what gets unencrypted. In the example, a location/distance 232, a price/numeric figure 234, a geographic location 236, and an identity/likeness 238 are restricted information segments, identified as data one might want to protect as private.

In some embodiments, a natural language analysis is performed on the text content of the electronic file. An entity detection process is performed. The entity detection can include noun identification, followed by identifying a subset of nouns including proper nouns and nouns deemed to be topically pertinent. The entity detection can include identification of entity relationships. Entity relationships can include, but are not limited to, "is a kind of," "entails," "pertains to," "is a member of," "is a part of," "is an instance of," "causes," "is an opposite of," and others. In some embodiments, entities can have more than one entity relationship between them. Other entity relationships are possible.

The natural language analysis process can include, but is not limited to, indexing, concordance, stop word processing, bigram processing, dispersion analysis, lexical richness analysis (ratio of distinct words to total words), disambiguation, part-of-speech analysis, and/or anaphora resolution (the process of identifying what a pronoun or noun phrase refers to). Additionally, the natural language analysis process can include the use of trained classifiers, including, but not limited to, decision trees, naive Bayes classifiers, Maximum Entropy classifiers, decision trees, and/or support vector machines.

Some embodiments include performing image recognition techniques on image content of a file.

An object recognition process is performed. The object recognition process may perform a variety of image processing techniques such as edge detection, shape detection, clustering, and/or probabilistic classifiers to determine the objects present. The object recognition analysis may include performing an edge detection process to determine the outer edges of the objects in the file. Some embodiments may utilize a Canny edge detector algorithm. Some embodiments may utilize mathematical models, such as a deformable contour model, and/or an active shape model for detection of the objects. The object recognition analysis may instead, or in addition to, perform a color analysis.

Some embodiments include performing facial recognition on the image content of a file. An item of content including an image or video may be analyzed. Edge detection, gradient processing, and other processes may be used to match features of a face in the image with a known face from a database, such as a celebrity or one of the participant's connections on the social media website. In addition, detection of facial expressions may be performed by computer-implemented recognition of one or more action units (AUs) from a face in the image. From the facial expressions, embodiments associate metadata with the items of content.

Figure 3:
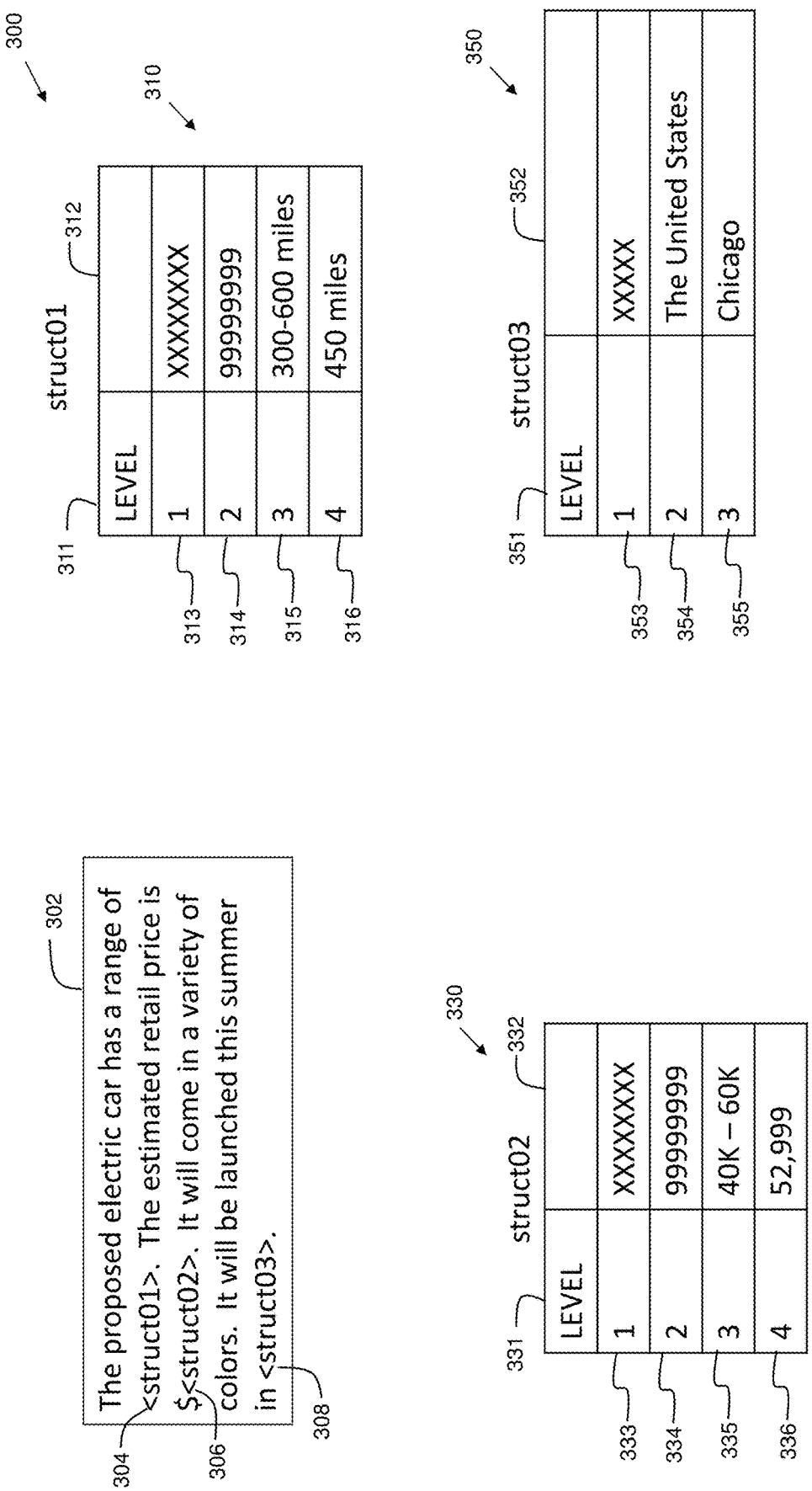
FIG. 3 shows examples of multiple-value encrypted field structures and a field-secured electronic file.

FIG. 3 shows examples at 300 of multiple-value encrypted field structures 310, 330, and 350, and a field-secured electronic file 302. Field-secured electronic file 302, as shown is an excerpt of text, with reference tags 304, 306, and 308 inserted, substituting the original text. The original text stated "450 miles", and now a tag 304, namely, <struct01> is inserted in its place. The original text stated "52,999", and now a tag 306, namely, <struct02> is inserted in its place. The original text stated "Chicago", and now a tag 308, namely, <struct03> is inserted in its place.

Each reference tag 304, 306, and 308 references a corresponding multiple-value encrypted field structure 310, 330, and 350, respectively. The information in column 312, 332, and 352 is stored in encrypted form, based on a particular key associated with the privilege level. However, for the purposes of illustrating the embodiments, the information is shown unencrypted in FIG. 3. In embodiments, these structures 310, 330, and 350 are implemented in XML, JSON, or other suitable format.

In the structure 310 for the first tag, <struct01>, the cells of first column 311 show user privilege level and the cells of second column 312 show the data sequences, some of which are alternative to the original, corresponding to each respective user privilege level. Table 310 is an example of distance boundary data. As shown in row 313, when a user assigned privilege level 1 (the lowest level) accesses file 302, alternative data sequence, XXXXXXXX, is inserted in place of the tag 304. Shown in row 314, when a user assigned privilege level 2 (the second-to-lowest level) accesses file 302, alternative data sequence, 99999999, is inserted in place of the tag 304. Shown in row 315, when a user assigned privilege level 3 (the second-to-highest level) accesses file 302, alternative data sequence, 300-600 miles, is inserted in place of the tag 304. Shown in row 316, when a user assigned privilege level 4 (the highest privilege level) accesses file 302, original data sequence, 450 miles, is inserted in place of the tag 304.

In the structure 330 for the second tag, <struct02>, the cells of first column 331 show user privilege level and the cells of the second column 332 show the data sequences, some of which are alternative to the original, corresponding to each respective user privilege level. Table 330 is an example of numerical boundary data. As shown in row 333, when a user assigned privilege level 1 (the lowest level) accesses file 302, alternative data sequence, XXXXXXXX, is inserted in place of the tag 306. Shown in row 334, when a user assigned level 2 (the second-to-lowest level) accesses file 302, alternative data sequence, 99999999, is inserted in place of the tag 306. Shown in row 335, when a user assigned level 3 (the second-to-highest privilege level) accesses file 302, alternative data sequence, 40K-60K, is inserted in place of the tag 306. Shown in row 336, when a user assigned level 4 (the highest privilege level) accesses file 302, original data sequence, 52,999, is inserted in place of the tag 306.

In the structure 350 for the third tag, <struct03>, the first column 351 shows user privilege levels and the second column 352 show the data sequences, some of which are alternative to the original, corresponding to each respective user privilege level. Table 350 is an example of geographic boundary data. Geographic boundary data can include cities, states, provinces, counties, and/or other political boundaries. Geographic boundary data can also include natural boundaries such as continents and islands. Geographic boundary data can also include logical boundaries such as hemispheres. As shown in row 353, when a user assigned privilege level 1 (the lowest level) accesses file 302, alternative data sequence, XXXXX, is inserted in place of the tag 308. Shown in row 354, when a user assigned privilege level 2 (the middle level) accesses file 302, alternative data sequence, The United States, is inserted in place of the tag 308. Shown in row 355, when a user assigned privilege level 3 (the highest privilege level) accesses file 302, actual data sequence, Chicago, is inserted in place of the tag 308. Note that not all fields need the same number of levels, and in the example, if a user has permission level 4, but the table (e.g., table 350) has only three entries, then the key for level 3 is used to decrypt the information, since a user at permission level four has all four of the keys.

In embodiments, encrypting the fields of the multiple-value encrypted field structure is performed using a symmetric encryption algorithm. The algorithm may include, but is not limited to, DES, RSA, AES, and/or Blowfish. A user at a lowest privilege level only has a key corresponding to the lowest level. For example, a user assigned privilege level 1 has only the key for level 1. A user at a level any higher than the lowest has the key for the assigned permission level, as well as the key/keys for any levels below the assigned level. Accordingly, in the example, a user assigned privilege level 3 has the keys for levels 3, 2, and 1.

Figure 4:
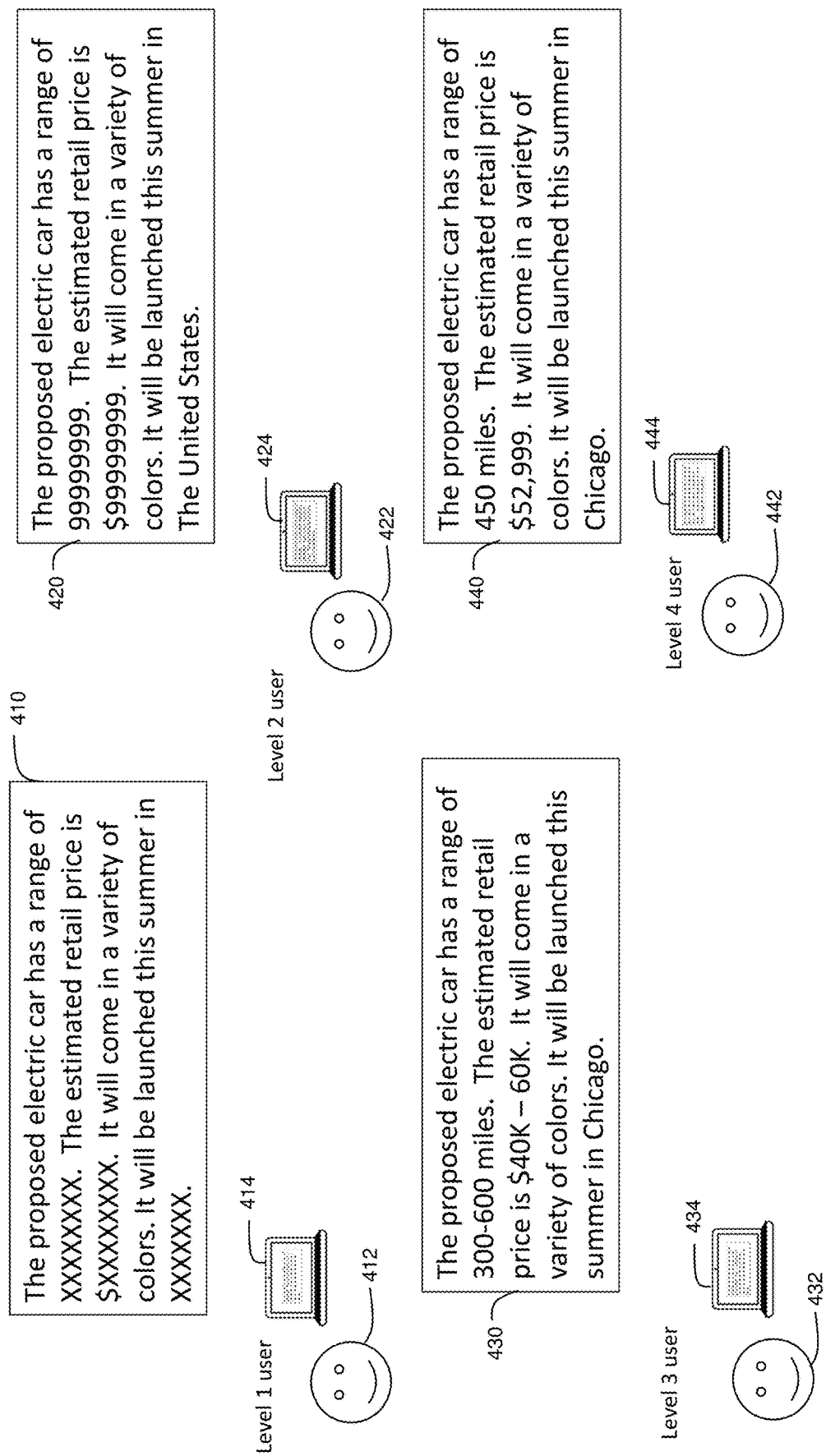
FIG. 4 shows various versions of an exemplary field-secured electronic file based on different user privilege levels.

FIG. 4 shows various versions 410, 420, 430, and 440 of an exemplary field-secured electronic file based on different user privilege levels. Users 412, 422, 432, and 442 are provided corresponding versions 410, 420, 430, and 440, respectively, of a single document, rendered on an electronic display of their respective electronic device 414, 424, 434, and 444.

In some embodiments, generating an alternative data sequence comprises generating redaction text data. Version 410, appearing on the screen of user device 414 belonging to user 412, shows redaction text data as XXXXXXXX in place of the restricted information segment (original text data). Accordingly, the user 412, who is assigned privilege level 1, is provided no indication of the values, or whether they include a name, number, or other item, etc.

In some embodiments, generating an alternative data sequence comprises generating numerical text data. Version 420, appearing on the screen of user device 424 belonging to user 442, shows numerical text data as 99999999 in place of the restricted information segment (original text data). Accordingly, the user 422, who is assigned privilege level 2, is provided an indication that the values are numbers, but with no details of what the true numbers are.

In some embodiments, generating an alternative data sequence comprises generating range text data. Version 430, appearing on the screen of user device 434 belonging to user 432, shows range text data. Accordingly, the user 432, who is assigned privilege level 3, is provided with a rough range (e.g., 40-60 K for a price) in which the true value (original data) falls, but no other details as to exactly what the true value is.

Embodiments include inserting the restricted information segment as a most restrictive field of the multiple-value field structure. Version 440, appearing on the screen of user device 444 belonging to user 442, shows the restricted information segment (the original data) inserted therein. Accordingly, the user 442, who is assigned the highest privilege level (in the example, level 4), is provided with the true values.

In embodiments, generating an alternative data sequence comprises generating geographic boundary descriptive data. A geographic boundary may be inserted which is more generic than the true location. The boundary may be of a greater extent the lower the privilege level assigned to a user. For example, original data "Chicago" 236 in FIG. 2 could be replaced with "United States" for a user assigned a middle privilege level (2) as shown at 354 in structure 350 of FIG. 3.

Figure 5:
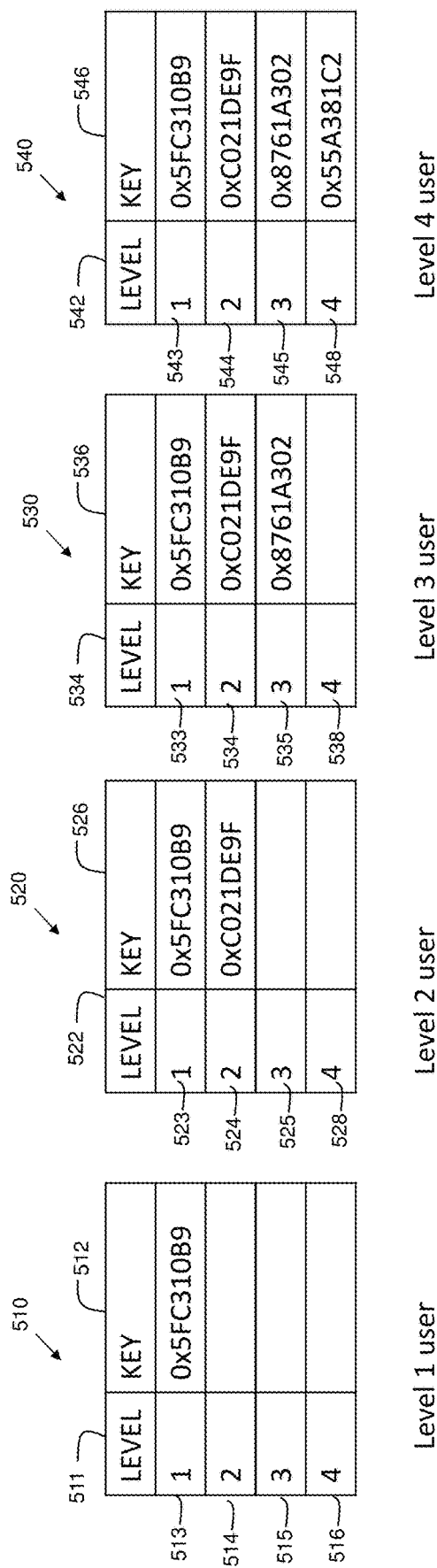
FIG. 5 shows exemplary key structures, based on different user privilege levels.

FIG. 5 shows exemplary key structures 510, 520, 530, and 540, each based on different user privilege levels. An applicable key structure, selected based on the user's privilege level, is retrieved from a key server 122 (FIG. 1) and sent to a client 106 (FIG. 1) upon successful user authentication. The key structure may be sent securely to the user's client (e.g., via ssh or other suitable mechanism). Each key structure contains one or more keys. In the example, there are four key structures 510, 520, 530, and 540.

In key structure 510, the cells of the first column 511 show user privilege levels, and the cells of the second column 512 show keys corresponding to each respective user privilege level. Table 510 is an example of a key structure for a user with a lowest user privilege level. Accordingly, there is only one key. As shown in row 513, when a user is assigned level 1, the lowest privilege level, key 0x5FC310B9, is available. Rows 514, 515, and 516 corresponding to the higher privilege levels are empty.

In key structure 520, the cells of the first column 522 show user privilege levels, and the cells of the second column 526 show keys corresponding to each respective user privilege level. Table 520 is an example of a key structure for a user with a second-to-lowest user privilege level. Accordingly, there are only two keys. As shown in row 523, the lowest privilege level key, 0x5FC310B9, is available. Shown in row 524, the key for level 2, 0xC021DE9F, is also available. Rows 525 and 528 corresponding to the higher privilege levels are empty.

In key structure 530, the cells of the first column 534 show user privilege levels, and the cells of the second column 536 show the keys corresponding to each respective user privilege level. Table 530 is an example of a key structure for a user with a second-to-highest user privilege level. Accordingly, there are three keys. As shown in row 533, the lowest privilege level key, 0x5FC310B9, is available. Shown in row 534, the key for level 2, 0xC021DE9F, is also available. Shown in row 535, the key for level 3, 0x8761A302, is available as well. Row 538 corresponding to the highest privilege level is empty.

In key structure 540, the cells of the first column 542 show user privilege levels, and the cells of the second column 546 is for the keys corresponding to each respective user privilege level. Table 540 is an example of a key structure for a user with a highest user privilege level. Accordingly, there are four keys. As shown in row 543, the lowest privilege level key, 0x5FC310B9, is available. Shown in row 544, the key for level 2, 0xC021DE9F, is also available. Shown in row 545, the key for level 3, 0x8761A302, is available as well. Shown in row 548, the key for level 4, 0x55A381C2, is also available. In the examples, there are four user privilege levels, but in other embodiments, there can be more or fewer privilege levels with corresponding keys.

Figure 6A:
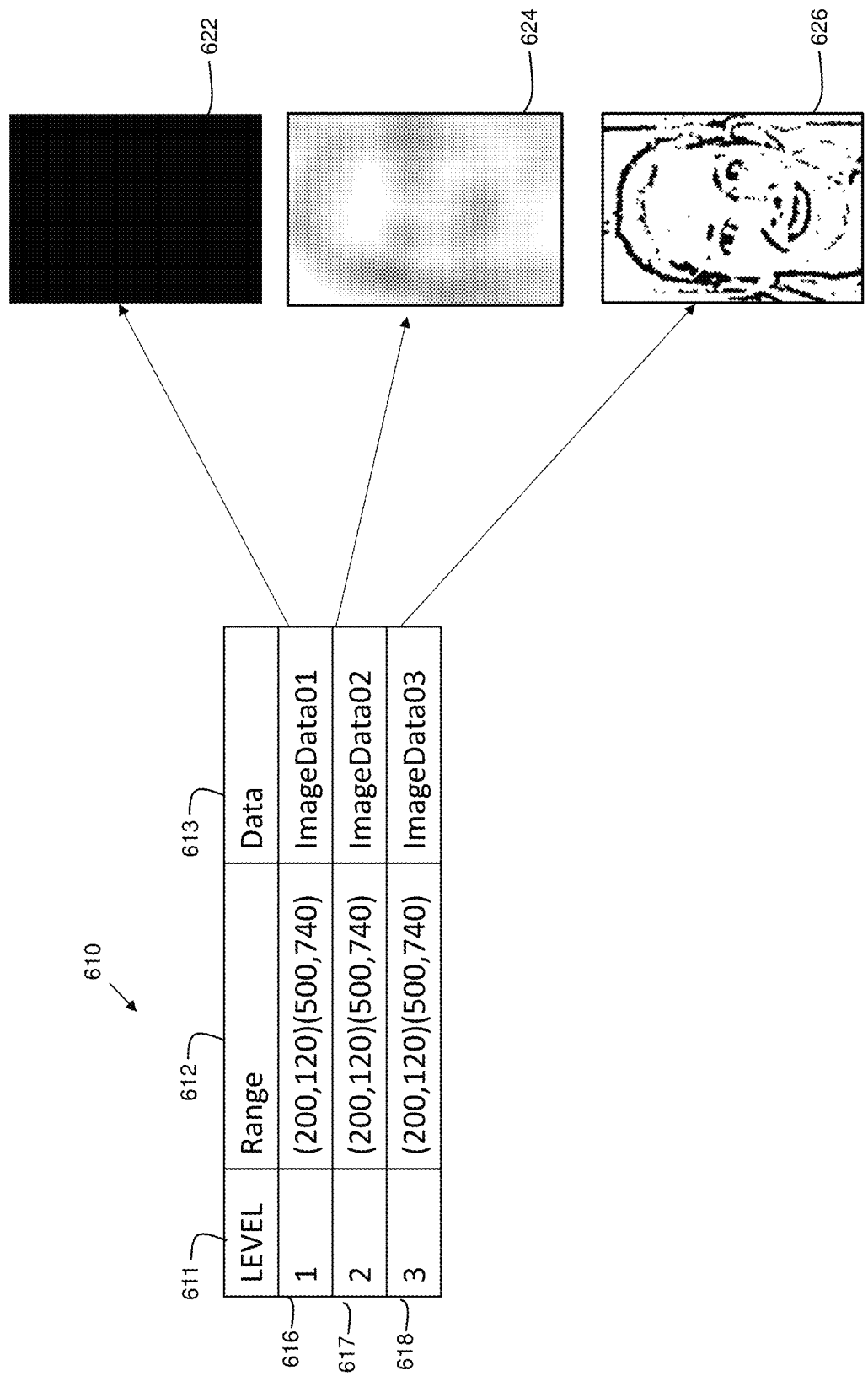
FIG. 6A illustrates a multiple-value encrypted field for image data.

FIG. 6A illustrates a multiple-value encrypted field structure 610 for image data. The table has three columns: column 611 storing privilege level, column 612 storing ranges, and column 613 storing data. The table has three rows—616, 617, and 618. In embodiments, the range is a tuple specifying a range of image data to replace. In other embodiments, XY coordinate pairs or other identifiers are possible.

In this example, based on restricted information segment 238 (FIG. 2), three sets of image data are generated. In all three rows 616, 617, and 618, the range is identified as "(200, 120) (500, 740)". In embodiments, these values define an upper left location and lower right location of a range of pixels within an image that make up a restricted information segment. As shown in row 616, for privilege level 1, the data information segment is ImageData01 corresponding to image 622. As shown in row 617, for privilege level 2, the data information segment is ImageData02 corresponding to image 624. As shown in row 618, for privilege level 3, the data information segment is ImageData03 corresponding to image 626. Segments including ImageData01 and ImageData02 are for alternative data sequences, while ImageData03 is for the restricted data sequence (original).

Note that the restricted data sequences and the original data sequence are stored encrypted, in association with corresponding keys. When decrypted using the appropriate key after user authentication, the image data appears, which can be redacted, blurred, original, or other suitable rendering.

In some embodiments, generating an alternative data sequence comprises generating redaction image data (or fully-obfuscated or obstructed). For example, ImageData01 could be encrypted with, and therefore, decrypted with a key corresponding to a privilege level 1 (a lowest level). When decrypted, a redaction image 622 is inserted to the electronic file in the location specified by the associated tag. The user cannot discern any details from the redacted image.

In some embodiments, generating an alternative data sequence comprises generating blurred (or partially-obfuscated or obstructed) image data. ImageData02 could be encrypted with, and therefore decrypted with, a key corresponding to a privilege level 2 (a middle level). When decrypted, a blurred image 624 is inserted to the electronic file in place of the restricted data sequence. The user may be able to discern some details from the image, such as possibly whether a person, place, or thing is shown, a gender of a person, an approximate age of a person, etc.

In embodiments, generating an original data sequence comprises generating original image data. ImageData03 could be encrypted with, and therefore decrypted with, a key corresponding to a privilege level 3 (a highest level). When decrypted, an original image 626 is inserted to the electronic file in the location specified by the associated tag. Accordingly, the user can discern substantially all details from the unobstructed or un-obfuscated image.

In some embodiments, rather than apply a blur or other obstruction effect to an entire image, instead, the effect is applied to a portion of the image desired to be protected. For example, a human face is identified in image data within the electronic file. An area around the face is delineated, and the delineated area is replaced with image data from the multiple-value encrypted field structure, as shown in FIGS. 6B-6D.

Figure 6B:
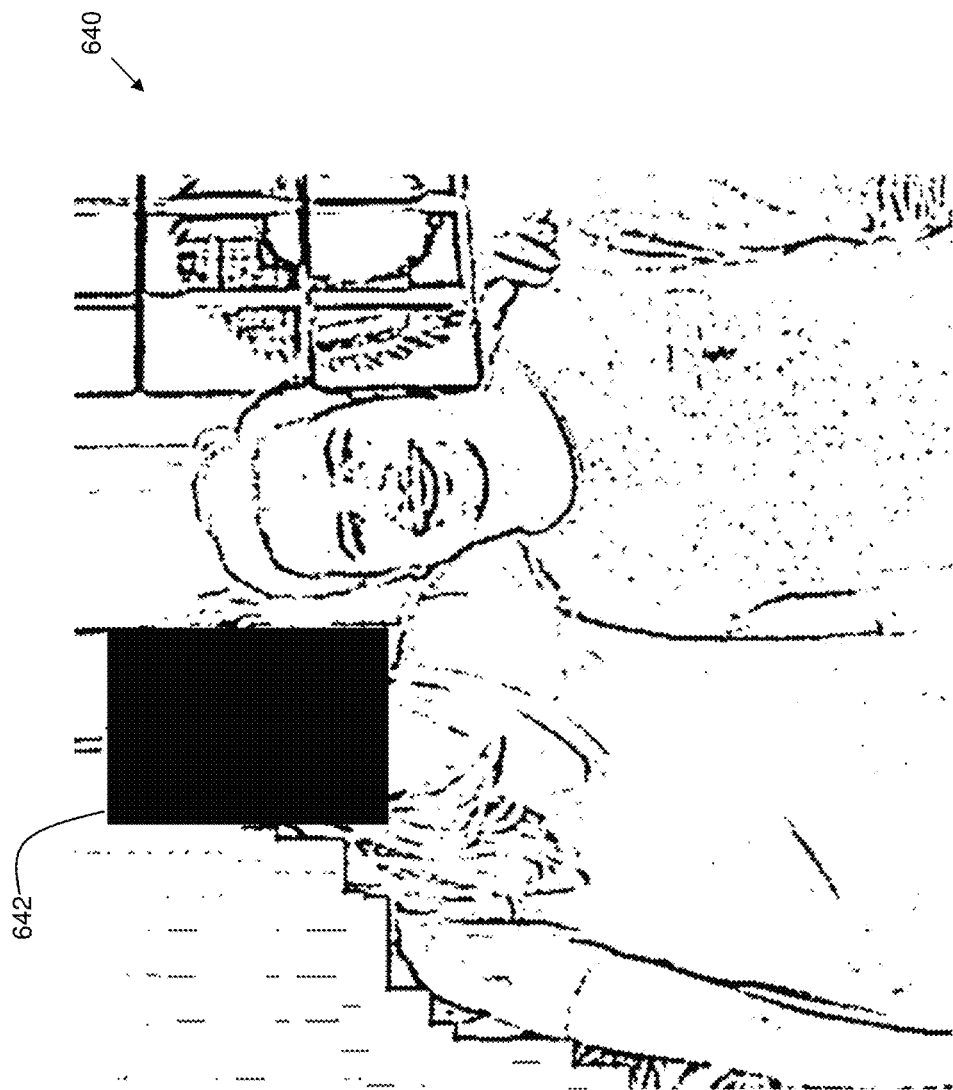
FIG. 6B illustrates an exemplary reconstructed image using redacted image data.

FIG. 6B illustrates an exemplary reconstructed image using redacted image data. As shown, the image 640 at privilege level 1 is reconstructed from redacted image data. Redacted image data is the most restrictive, and the area 642 around the face in the image is completely obfuscated or obstructed such that the user cannot discern any details of the private data.

Figure 6C:
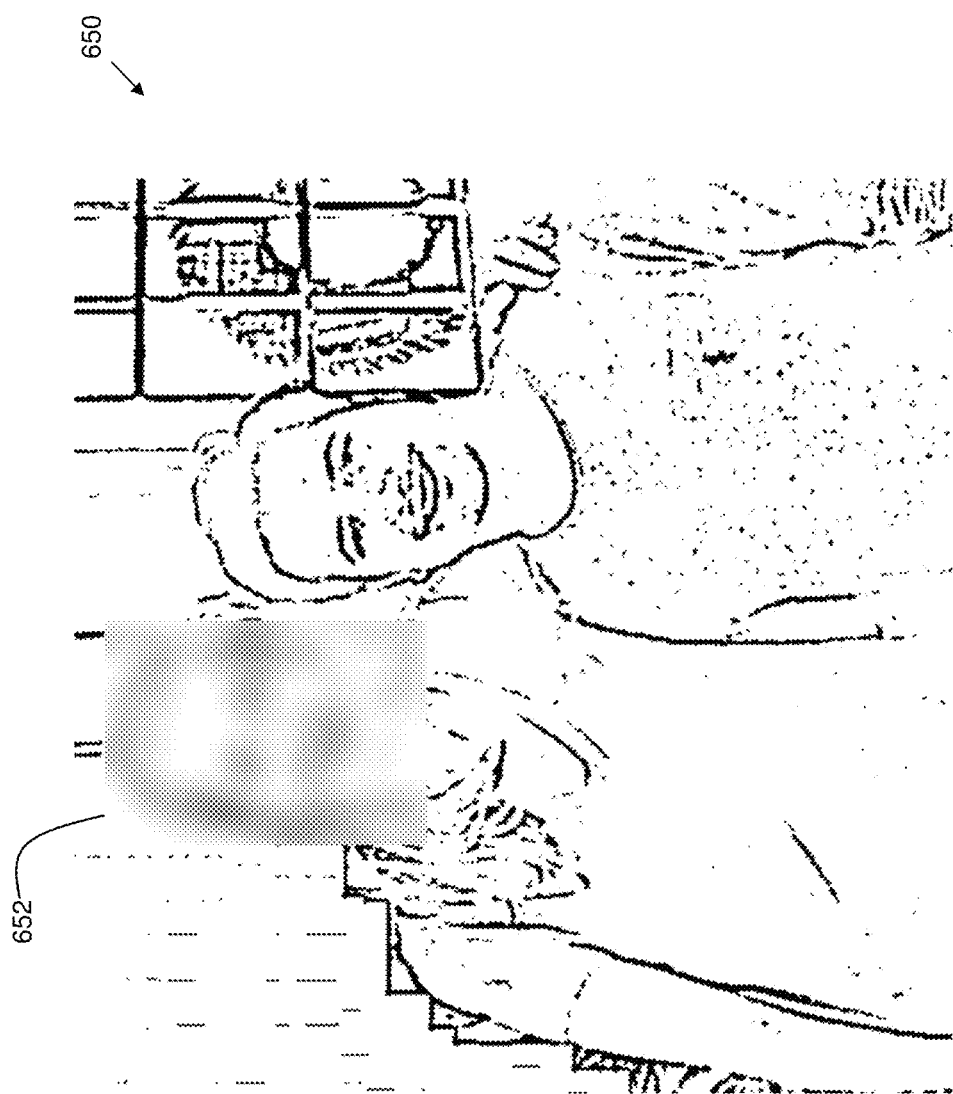
FIG. 6C illustrates an exemplary reconstructed image using blurred image data.

FIG. 6C illustrates an exemplary reconstructed image using blurred image data. As shown, the image 650 at privilege level 2 is reconstructed from blurred image data. Blurred image data is the mid-level restrictive, and the area 652 around the face in the image is partially blurred (or, in some cases, partially-obfuscated or obstructed) such that the user can discern some, but not all, details of the private data. Through the blur, a user can discern here that there is a person in the private data, and the person appears to be female. Yet, the user cannot discern the true identity of the person.

Figure 6D:
FIG. 6D illustrates an exemplary reconstructed image using original image data.

FIG. 6D illustrates an exemplary reconstructed image using original image data. As shown, the image 660 at privilege level 3 is reconstructed from original image data. Original image data is not restricted, and the area 662 around the face in the image is shown clearly and fully, such that the user can discern all details of the private data, including the facial features, and accordingly, the true identity of the person. While the aforementioned example applies to still image data, disclosed embodiments may also, or instead, be utilized with video data.

Figure 7:
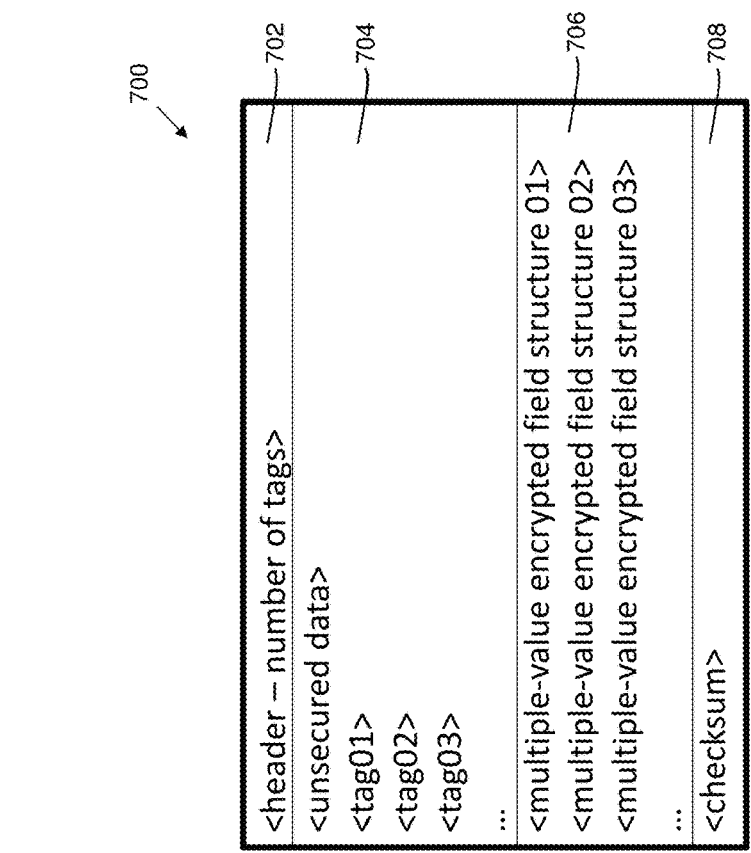
FIG. 7 shows an exemplary structure of a field-secured electronic file.

FIG. 7 shows an exemplary structure 700 of a field-secured electronic file. In the corresponding structure, at field 702, there is a header, which includes metadata, including the number of tags. In some embodiments, additional data may be included therein such as author, creation date, etc. At field 704, there is unsecured data. This is data that is not associated with the multiple value encrypted fields. At field 706, there is appended each multiple value encrypted field. Examples can include 310, 330, and 350 (FIG. 3). At field 708, there is a checksum. The checksum field can be used to verify the integrity of the data in the structure 700.

Figure 8:
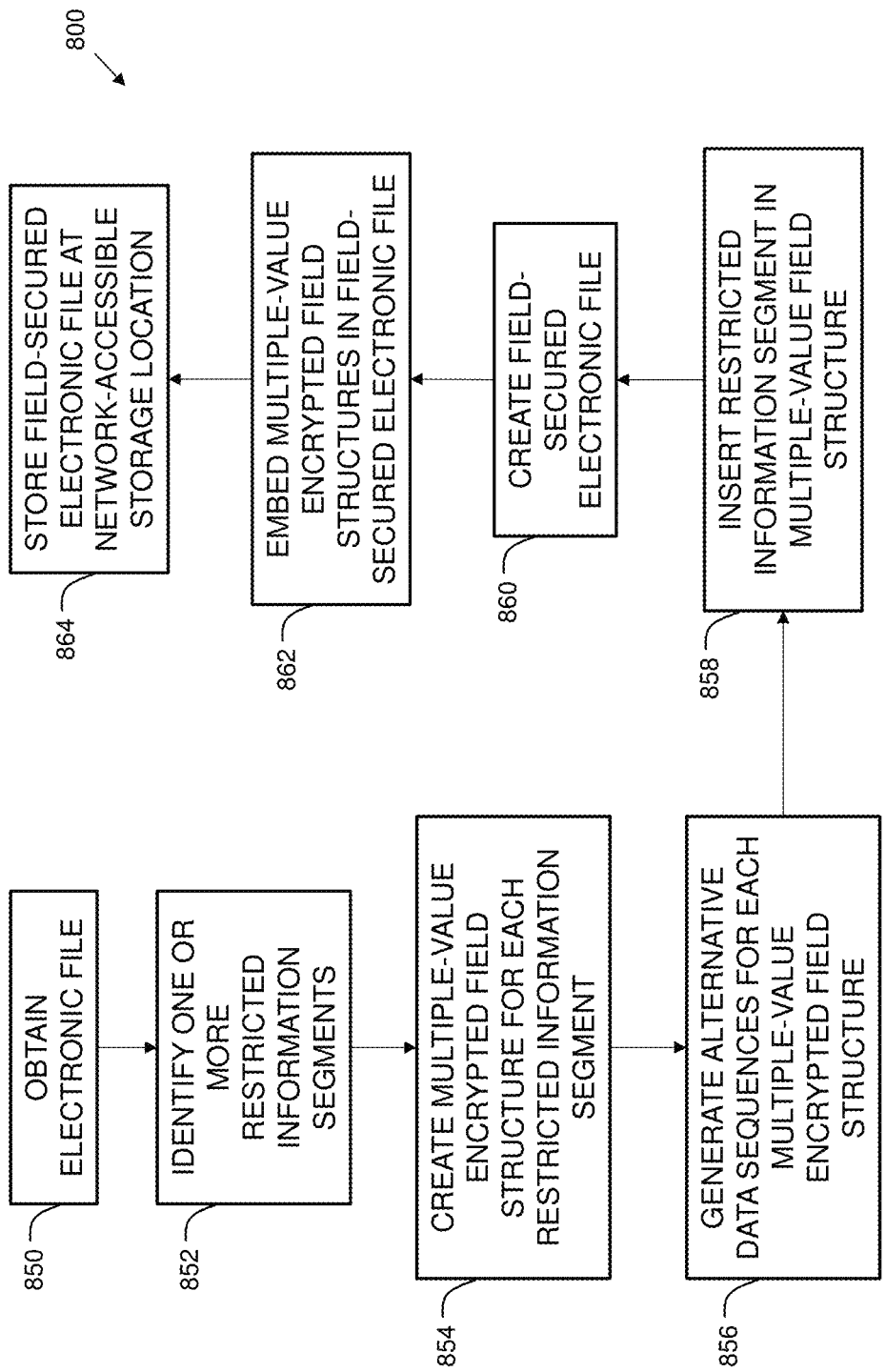
FIG. 8 is a flowchart indicating process steps for embodiments of the present invention.

FIG. 8 is a flowchart 800 indicating process steps for embodiments of the present invention. At 850, an electronic file is obtained. This may be a document, image, etc. At 852, one or more restricted information segments are identified in the file. This is an unencrypted "in the clear" file for which it is desired to create multiple levels of protection for one or more pieces of information within that file. At 854, a multiple-value encrypted field structure is created for each restricted information segment. At 856, alternative data sequences are generated for each multiple-value encrypted field structure (note that in some embodiments, the structure may include only one field with one alternative data sequence). The alternative data sequences can include redaction strings such as "XXXXX," numeric ranges, geographical regions, or other values. In embodiments, the alternative data sequences are selected either by a user and/or a computer executing natural language processing functions. The alternative data sequences may provide additional context without revealing all the details of the original content. At 858, the restricted information segment is inserted in the multiple-value field structure. At 860, a field-secured electronic file is created. At 862, the multiple-value encrypted field structures are embedded in the field-secured electronic file. At 864, the field-secured electronic file is stored at a network-accessible storage location, such as the cloud storage system 116 (FIG. 1).

Figure 9:
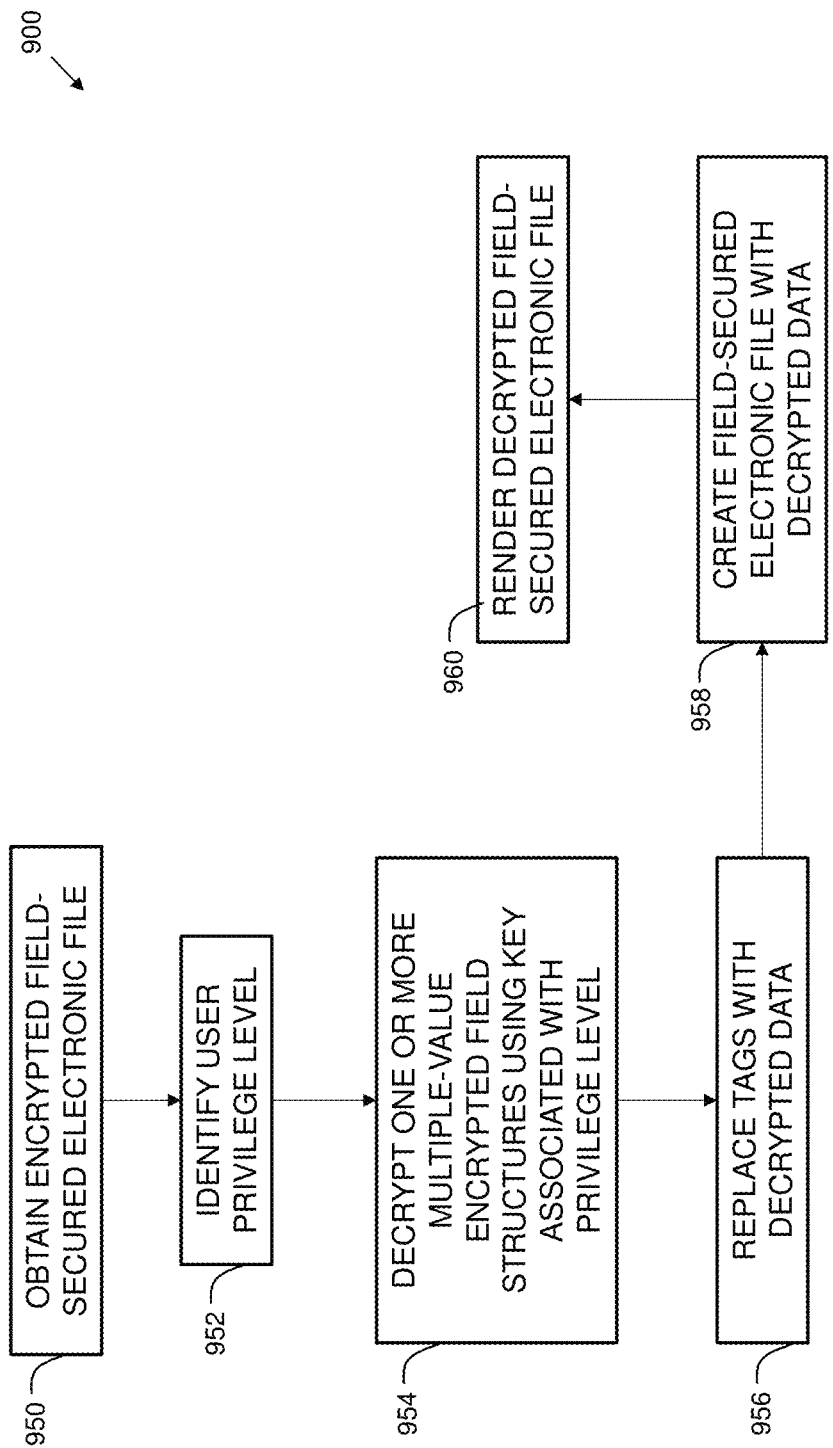
FIG. 9 is a flowchart indicating additional process steps for embodiments of the present invention.

FIG. 9 is a flowchart 900 indicating additional process steps for embodiments of the present invention. At 950, an encrypted field-secured electronic file is obtained. This electronic file contains one or more multiple-value encrypted field structures. At 952, a user privilege level assigned to an authenticated user is identified based on authentication credentials. The authentication credentials can include usernames, passwords, security tokens, biometric identifiers, and/or other suitable authentication credentials. At 954, the one or more multiple-value encrypted field structures, embedded in the electronic file, is decrypted using a key associated with the identified privilege level. At 956, tags in the electronic file are replaced with decrypted data. At 958, a decrypted field-secured electronic file is created with decrypted data. At 960, a decrypted field-secured electronic file is rendered on the user interface (screen) of a client device of a user. The rendering shows the decrypted information for the fields in the multiple-value encrypted field structures that correspond to the privileges of the user that were obtained at 952.

As can now be appreciated, disclosed embodiments provide techniques for accessing a document from a cloud storage system and control the display of sensitive data within the document based on user permissions associated with the privilege level assigned to the user. While disclosed embodiments depicted specific details, other embodiments may utilize a variety of different techniques. For example, in some embodiments, a browser plugin executing on a client device may perform some of the functions and/or process steps. In some embodiments, some or all of the process steps may be performed on a cloud storage device. Other implementations are possible. With disclosed embodiments, a large document which contains limited sensitive data throughout the document can be easily shared in a cloud storage system, and the sensitive data is presented, hidden, or obfuscated based on privilege levels of the user that is accessing the document. This enables a new level of data sharing while still maintaining a degree of confidentiality for sensitive information. Thus, disclosed embodiments can improve the technical field of electronic document storage.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method comprising:
obtaining an electronic file;
identifying a restricted information segment of the electronic file;
creating a multiple-value encrypted field structure for the restricted information segment;
generating an alternative data sequence for one or more fields of the multiple-value encrypted field structure, wherein generating an alternative data sequence comprises generating geographic boundary descriptive data;
inserting the restricted information segment as a most restrictive field of the multiple-value encrypted field structure;
editing the electronic file to substitute the restricted information segment with a tag, wherein the tag references the multiple-value encrypted field structure, thereby creating a field-secured electronic file;

embedding the multiple-value encrypted field structure in the field-secured electronic file;

storing the field-secured electronic file at a network-accessible storage location;

identifying a geographic location within the electronic file; and replacing the geographic location with a more generic geographic boundary from the geographic boundary descriptive data.

2. The method of claim 1, wherein generating an alternative data sequence comprises generating redaction text data.

3. The method of claim 1, wherein generating an alternative data sequence comprises generating range text data.

4. The method of claim 1, wherein generating an alternative data sequence comprises generating redaction image data.

5. The method of claim 1, wherein generating an alternative data sequence comprises generating blurred image data.

6. The method of claim 1, wherein identifying a restricted information segment of the electronic file comprises:

identifying a human face in image data within the electronic file;

delineating an area around the human face; and replacing the delineated area with image data from the multiple-value encrypted field structure.

7. The method of claim 1, wherein creating a multiple-value encrypted field structure comprises encrypting fields of the multiple-value encrypted field structure with a symmetric encryption algorithm.

8. The method of claim 1, wherein the geographic location is a city, and wherein the geographic boundary is a state.

9. The method of claim 1, wherein the geographic location is a city, and wherein the geographic boundary is a country.

10. An electronic communication device comprising:

a processor;

a memory coupled to the processor, the memory containing instructions, that when executed by the processor, perform the steps of:

obtaining an electronic file;

identifying a restricted information segment of the electronic file;

creating a multiple-value encrypted field structure for the restricted information segment;

generating an alternative data sequence for one or more fields of the multiple-value encrypted field structure, wherein generating an alternative data sequence comprises generating geographic boundary descriptive data;

inserting the restricted information segment as a most restrictive field of the multiple-value encrypted field structure;

editing the electronic file to substitute the restricted information segment with a tag, wherein the tag references the multiple-value encrypted field structure, thereby creating a field-secured electronic file;

embedding the multiple-value encrypted field structure in the field-secured electronic file;

storing the field-secured electronic file at a network-accessible storage location;

identifying a geographic location within the electronic file; and replacing the geographic location with a more generic geographic boundary from the geographic boundary descriptive data.

11. The electronic communication device of claim 10, wherein the memory further comprises instructions, that when executed by the processor, perform the step of generating redaction text data.

12. The electronic communication device of claim 10, wherein the memory further comprises instructions, that when executed by the processor, perform the step of generating range text data.

13. The electronic communication device of claim 10, wherein the memory further comprises instructions, that when executed by the processor, perform the step of generating redaction image data.

14. The electronic communication device of claim 10, wherein the memory further comprises instructions, that when executed by the processor, perform the step of generating blurred image data.

15. The electronic communication device of claim 10, wherein the memory further comprises instructions, that when executed by the processor, perform the step of encrypting fields of the multiple-value encrypted field structure with a symmetric encryption algorithm.

16. A computer program product for an electronic communication device comprising a computer readable storage medium having program instructions embodied therewith, the program instructions executable by a processor to cause the electronic communication device to perform the steps of:

obtaining an electronic file;

identifying a restricted information segment of the electronic file;

creating a multiple-value encrypted field structure for the restricted information segment;

generating an alternative data sequence for one or more fields of the multiple-value encrypted field structure, wherein generating an alternative data sequence comprises generating geographic boundary descriptive data;

inserting the restricted information segment as a most restrictive field of the multiple-value encrypted field structure;

editing the electronic file to substitute the restricted information segment with a tag, wherein the tag references the multiple-value encrypted field structure, thereby creating a field-secured electronic file;

embedding the multiple-value encrypted field structure in the field-secured electronic file; and storing the field-secured electronic file at a network-accessible storage location;

identifying a geographic location within the electronic file; and replacing the geographic location with a more generic geographic boundary from the geographic boundary descriptive data.

17. The computer program product of claim 16, wherein the computer readable storage medium includes program instructions executable by the processor to cause the electronic communication device to perform the step of generating range text data.

18. The computer program product of claim 16, wherein the computer readable storage medium includes program instructions executable by the processor to cause the electronic communication device to perform the step of generating blurred image data.

19. The computer program product of claim 16, wherein the computer readable storage medium includes program instructions executable by the processor to cause the electronic communication device to perform the step of generating redaction image data.

20. The computer program product of claim 16, wherein the geographic location is a city, and wherein the geographic boundary is a country.

\* \* \* \* \*